(12) United States Patent
Kumazaki

(10) Patent No.: US 12,371,038 B2
(45) Date of Patent: Jul. 29, 2025

(54) VEHICLE CONTROL DEVICE, STORAGE MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventor: Kenta Kumazaki, Edogawa-ku-Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 347 days.

(21) Appl. No.: 18/165,618

(22) Filed: Feb. 7, 2023

(65) Prior Publication Data

US 2023/0311914 A1 Oct. 5, 2023

(30) Foreign Application Priority Data

Apr. 4, 2022 (JP) ................. 2022-062551

(51) Int. Cl.
*B60W 50/08* (2020.01)
*B60W 50/10* (2012.01)
*B60W 60/00* (2020.01)

(52) U.S. Cl.
CPC ........ *B60W 50/10* (2013.01); *B60W 60/0053* (2020.02); *B60W 2510/202* (2013.01); *B60W 2552/53* (2020.02)

(58) Field of Classification Search
CPC ....... B60W 2510/202; B60W 2552/53; B60W 50/10; B60W 60/0053; B62D 15/025

USPC .............. 701/1, 23–28, 36, 41–44
See application file for complete search history.

(56) References Cited

U.S. PATENT DOCUMENTS

| | | | | |
|---|---|---|---|---|
| 7,698,032 B2* | 4/2010 | Matsumoto | ......... | B60T 8/17557 701/79 |
| 9,607,513 B1* | 3/2017 | Williams | .............. | B60W 50/14 |
| 2009/0312909 A1* | 12/2009 | Onuma | .................. | B62D 6/008 701/41 |
| 2010/0131148 A1* | 5/2010 | Camhi | .................. | B60W 40/09 701/31.4 |

(Continued)

FOREIGN PATENT DOCUMENTS

| JP | 2005-263031 A | 9/2005 |
|---|---|---|
| JP | 2008-087533 A | 4/2008 |

(Continued)

*Primary Examiner* — Jonathan L Sample
(74) *Attorney, Agent, or Firm* — Sughrue Mion, PLLC

(57) ABSTRACT

A vehicle control device has a processor configured to set a target torque as a target for driver torque at which generation of anti-torque on a steering wheel is to be initiated, based on a reference torque as a reference for driver torque at which generation of anti-torque is to be initiated against the driver torque produced by operation of the steering wheel by a driver, and a current correction value for the reference torque, to count a number of deviations from a lane marking line of a lane in which the vehicle is traveling while the driver torque exceeds the target torque, and to calculate a new correction value for the reference torque based on a correction coefficient that is set based on the number of deviations, wherein the next target torque is set based on the reference torque and the new correction value for the reference torque.

6 Claims, 7 Drawing Sheets

(56) References Cited

U.S. PATENT DOCUMENTS

| | | | | |
|---|---|---|---|---|
| 2011/0044507 A1* | 2/2011 | Strauss | ............... | B60W 40/04 |
| | | | | 382/103 |
| 2013/0238192 A1* | 9/2013 | Breu | ............... | B62D 15/029 |
| | | | | 701/41 |
| 2016/0362102 A1* | 12/2016 | Honda | ............... | B60W 30/045 |
| 2017/0088175 A1* | 3/2017 | Okuda | ............... | B62D 15/025 |
| 2017/0103657 A1* | 4/2017 | Hu | ............... | G01S 19/42 |
| 2017/0240177 A1* | 8/2017 | Fujii | ............... | B60W 30/12 |
| 2018/0186372 A1* | 7/2018 | Shimizu | ............... | B62D 6/08 |
| 2018/0201318 A1* | 7/2018 | Kataoka | ............... | G06V 20/588 |
| 2018/0297639 A1* | 10/2018 | Fujii | ............... | G05D 1/0246 |
| 2018/0346026 A1* | 12/2018 | Fujii | ............... | B62D 15/025 |
| 2020/0023884 A1* | 1/2020 | Mizoo | ............... | B60W 30/095 |
| 2020/0249037 A1* | 8/2020 | Gan | ............... | B60W 30/095 |
| 2020/0255012 A1* | 8/2020 | Sato | ............... | B60W 30/16 |
| 2020/0346642 A1* | 11/2020 | Varunjikar | ............... | B60W 50/0097 |
| 2022/0105984 A1* | 4/2022 | Kojo | ............... | B60W 30/12 |
| 2022/0289185 A1* | 9/2022 | Yoshihama | ............... | B60W 30/09 |
| 2022/0379902 A1* | 12/2022 | Deshpande | ............... | G08G 1/09623 |
| 2022/0396286 A1* | 12/2022 | Li | ............... | B60W 50/14 |

FOREIGN PATENT DOCUMENTS

| | | |
|---|---|---|
| JP | 2008-296605 A | 12/2008 |
| JP | 2020-192824 A | 12/2020 |

\* cited by examiner

VEHICLE CONTROL DEVICE, STORAGE MEDIUM FOR STORING COMPUTER PROGRAM FOR VEHICLE CONTROL, AND METHOD FOR CONTROLLING VEHICLE

FIELD

The present disclosure relates to a vehicle control device, to a storage medium storing a computer program for vehicle control, and to a method for controlling a vehicle.

BACKGROUND

An autonomous control system mounted in a vehicle generates a navigation route for the vehicle based on the current location of the vehicle, the destination location of the vehicle, and a navigation map. The autonomous control system estimates the current location of the vehicle using the map information and controls the vehicle to travel along the navigation route.

When the driver operates the steering wheel during autonomous controlled driving, the autonomous control system detects driver torque as the rotary force with which the steering wheel is rotated, and in response to the driver torque, generates anti-torque to rotate the steering wheel in the opposite direction from operation by the driver.

Anti-torque begins to be applied to the steering wheel when the autonomous control system has detected driver torque at or above a reference torque which is the driver torque at which generation of anti-torque on the steering wheel is to be initiated. Since anti-torque is greater with increased driver torque, this allows the driver to be made aware of the level of their own driver torque acting on the steering wheel.

Such an autonomous control system allows for steering operation by the driver while also causing the driver to be aware that the autonomous control system is in control of steering.

Japanese Unexamined Patent Publication No. 2008-296605 proposes a vehicle operation reaction force control device that further reduces driving burden by controlling the reaction force on an operating mechanism for a vehicle, such as a steering wheel, in a manner matching individual differences for different drivers.

SUMMARY

However, even if the size of anti-torque is varied to match the force applied when an individual driver is steering, the driver may become aware of steering at a more delayed timing if the anti-torque is not applied to the steering wheel at an appropriate starting point. The steering wheel may therefore be operated unconsciously by the driver, potentially causing the vehicle to deviate from the lane marking lines of the lane in which it is traveling.

It is therefore an object of the present disclosure to provide a vehicle control device that can help prevent deviation from the lane marking lines of the lane in which the vehicle is traveling, in a manner suited for individual drivers.

One embodiment of the invention provides a vehicle control device. The vehicle control device has a target torque setting unit that sets a target torque as a target for driver torque at which generation of anti-torque on a steering wheel is to be initiated, based on a reference torque as a reference for driver torque at which generation of anti-torque is to be initiated against the driver torque produced by operation of the steering wheel by a driver, and a current correction value for the reference torque; a counting unit that counts a number of deviations from a lane marking line of a lane in which the vehicle is traveling while the driver torque exceeds the target torque; and a correction value calculating unit that calculates a new correction value for the reference torque based on a correction coefficient that is set based on the number of deviations, wherein the target torque setting unit sets the next target torque based on the reference torque and the new correction value for the reference torque.

Preferably, the vehicle control device has a change calculating unit that calculates an amount of change in driver torque with respect to the target torque, and wherein the correction value calculating unit calculates the new correction value for the reference torque based on the correction coefficient and the amount of change in driver torque.

Also preferably in the vehicle control device, the correction value calculating unit calculates a second correction value based on distance that the vehicle has traveled while the driver torque exceeds the target torque and the number of deviations is not counted, and the target torque setting unit sets the next target torque based on the reference torque, the new correction value for the reference torque and the second correction value.

In this vehicle control device, the relationship between the correction coefficient and the number of deviations preferably has a first zone in which the correction coefficient increases as the number of deviations increases, a second zone in which the correction coefficient increases more than the first zone as the number of deviations increases, and a third zone in which the correction coefficient increases less than the second zone as the number of deviations increases.

According to another embodiment, a non-transitory storage medium storing a computer program for vehicle control is provided. The computer program for vehicle control causes a processor to execute a process, which process includes setting a target torque as a target for driver torque at which generation of anti-torque on a steering wheel is to be initiated, based on a reference torque as a reference for driver torque at which generation of anti-torque is to be initiated against the driver torque produced by operation of the steering wheel by a driver, and a current correction value for the reference torque; counting a number of deviations from a lane marking line of a lane in which the vehicle is traveling while the driver torque exceeds the target torque; and calculating a new correction value for the reference torque based on a correction coefficient that is set based on the number of deviations, wherein the next target torque is set based on the reference torque and the new correction value for the reference torque.

Yet another embodiment of the invention provides a method for controlling a vehicle carried out by a vehicle control device. The method includes setting a target torque as a target for driver torque at which generation of anti-torque on a steering wheel is to be initiated, based on a reference torque as a reference for driver torque at which generation of anti-torque is to be initiated against the driver torque produced by operation of the steering wheel by a driver, and a current correction value for the reference torque; counting a number of deviations from a lane marking line of a lane in which the vehicle is traveling while the driver torque exceeds the target torque; and calculating a new correction value for the reference torque based on a correction coefficient that is set based on the number of deviations, wherein the next target torque is set based on the reference torque and the new correction value for the reference torque.

The vehicle control device of the present disclosure sets the timing at which anti-torque is generated based on past operation of the steering wheel by the driver, so that the driver is aware of steering, and so that deviation from the lane marking lines of the lane in which the vehicle is traveling can be reduced in a manner matching individual differences for different drivers.

The object and advantages of the invention will be realized and attained by means of the elements and combinations particularly pointed out in the claims. It is to be understood that both the foregoing general description and the following detailed description are exemplary and explanatory and are not restrictive of the invention, as claimed

DESCRIPTION OF EMBODIMENTS

Figure 1A:
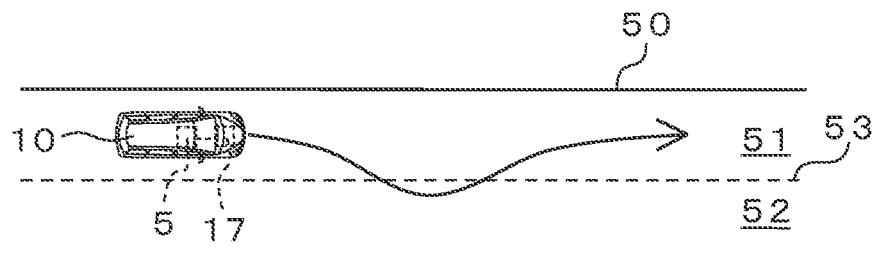
FIG. 1A is a diagram illustrating in overview the operation of a torque control device according to an embodiment, and showing the state of a vehicle traveling on a road.
Figure 1B:
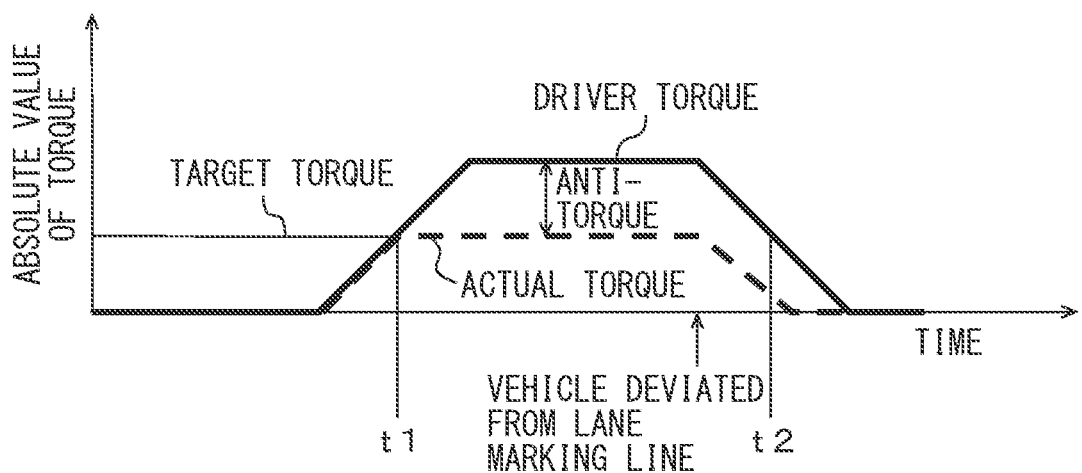
FIG. 1B is a diagram illustrating in overview the operation of the torque control device of the embodiment, and showing the relationship between driver torque and target torque.
Figure 1C:
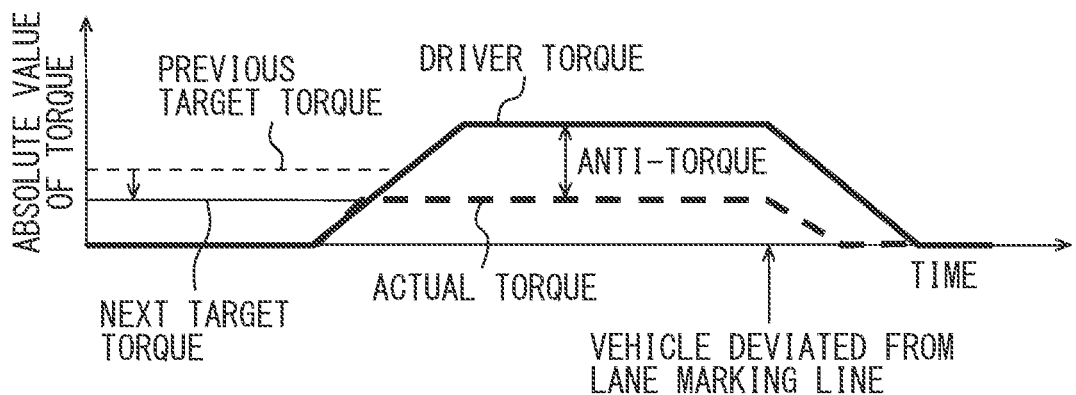
FIG. 1C is a diagram illustrating in overview the operation of the torque control device of the embodiment, with illustration of a new target torque.

FIG. 1A to FIG. 1C are diagrams illustrating in overview the operation of a torque control device according to the embodiment. FIG. 1A is a diagram showing the state of a vehicle traveling on a road. FIG. 1B is a diagram illustrating the relationship between driver torque and target torque. FIG. 1C is a diagram illustrating a new target torque.

Operation for vehicle control processing by the drive planning device 15 as disclosed herein will now be described in overview with reference to FIG. 1A to FIG. 1C.

As shown in FIG. 1A, a vehicle 10 travels on one lane 51 of a road 50 having two lanes 51, 52. The traffic lane 51 and traffic lane 52 are divided by a lane marking line 53.

The vehicle 10 being driven by autonomous control has a user interface (UI) 5 and a torque control device 17. When the driver operates the steering wheel (not shown), the torque control device 17 detects the driver torque as the rotary force causing the steering wheel to rotate. In response to the driver torque, the torque control device 17 generates anti-torque on the steering wheel, as rotary force causing the steering wheel to rotate in the opposite direction from operation by the driver. The vehicle 10 may be an autonomous vehicle.

As shown in FIG. 1A, the driver had merely intended to place his/her hands on the steering wheel, but this inadvertently resulted in operation of the steering wheel by the driver, causing the vehicle 10 to deviate from the lane marking line 52 of the lane 51 in which it was traveling.

FIG. 1B shows time-dependent change in the driver torque of the vehicle 10 shown in FIG. 1A. The ordinate axis represents the absolute torque value. Because of the large value of the driver torque as the starting point at which anti-torque is applied to the steering wheel, the timing for application of anti-torque to the steering wheel was delayed. Consequently, even though the anti-torque increased with greater driver torque, the timing by which the driver became aware of steering was delayed.

When the torque control device 17 detects driver torque, it sets the target torque as the target for driver torque at which generation of anti-torque on the steering wheel is to be initiated, based on a reference torque and a current correction value for the reference torque. The reference torque is the size of the torque to be used as reference for driver torque at which application of anti-torque to the steering wheel is to be initiated. The torque control device 17 begins to apply anti-torque to the steering wheel when it detects driver torque on the steering wheel that is at or above the target torque. As shown in FIG. 1B, rotation of the steering wheel of the vehicle 10 is produced by the actual torque, which is the difference between the driver torque and anti-torque.

The torque control device 17 begins to generate anti-torque on the steering wheel when the driver torque has reached the target torque. The direction in which the anti-torque rotates the steering wheel is opposite from the direction in which the steering wheel is rotated by driver torque. The torque control device 17 controls the size of the anti-torque to correspond to the size of the driver torque produced on the steering wheel.

Since the timing for anti-torque generation was delayed, however, the steering wheel was operated by the driver and the vehicle 10 was steered toward the right, causing the vehicle 10 to deviate from the lane marking line 52.

The torque control device 17 notifies the driver via the UI 5 that the vehicle 10 has deviated from the lane marking line 52. While notifying that the vehicle 10 has deviated from the lane marking line 52, the torque control device 17 may also make a request for switching of operation of the vehicle 10 from autonomous control to driver control.

The driver who has been notified that the vehicle 10 has deviated from the lane marking line 52 applies driver torque to the steering wheel to steer the vehicle 10 toward the left. The direction of driver torque in this case is opposite from the direction when steering the vehicle 10 to the right. The torque control device 17 continues to apply anti-torque to the steering wheel to correspond to the driver torque.

Driver torque applied to the steering wheel by the driver is reduced as the vehicle 10 moves toward the center of the lane 51. Anti-torque is also reduced with reduction of the driver torque. Since the vehicle 10 has returned to the center of the lane 51, the driver ceases manipulation of the steering wheel. Since driver torque is no longer present, the torque control device 17 stops application of anti-torque on the steering wheel.

While the driver torque exceeds the target torque, the torque control device 17 counts the number of deviations that the vehicle 10 has deviated from the lane marking line 53 of the lane 51. The torque control device 17 also calculates a new correction value for the reference torque, based on the correction coefficient that is set based on the number of deviations.

As shown in FIG. 1C, when the next driver torque has been detected, the torque control device 17 sets the next target torque based on the reference torque and the new correction value for the reference torque. The next target torque is lower than the previous value, and changes so that anti-torque is produced with a faster timing. This allows the driver to be aware of manipulation of the steering wheel at a faster timing.

By setting the starting point at which anti-torque is applied to the steering wheel according to past operation of the steering wheel by the driver, as explained above, the driver is aware of steering, thus helping to prevent deviation of the vehicle 10 from the lane marking line of the lane in which it is traveling, in a manner matching individual differences for different drivers.

Figure 2:
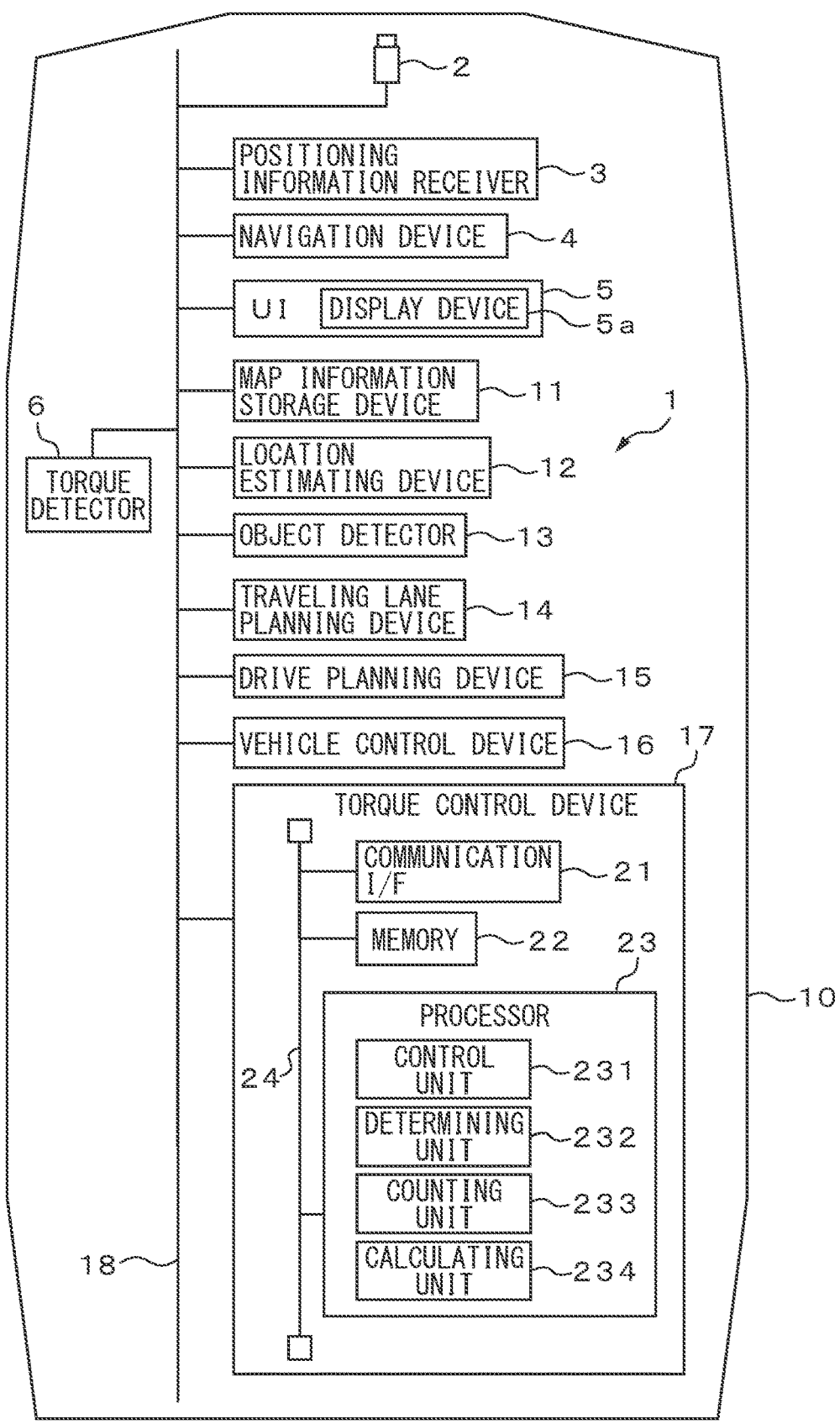
FIG. 2 is a general schematic drawing of a vehicle in which a vehicle control system of the embodiment is mounted.

FIG. 2 is a general schematic drawing of a vehicle 10 in which a vehicle control system 1 of the embodiment is mounted. The vehicle 10 has a camera 2, a positioning information receiver 3, a navigation device 4, a user interface (UI) 5, a torque detector 6, a map information storage device 11, a location estimating device 12, an object detector 13, a traveling lane planning device 14, a drive planning device 15, a vehicle control device 16 and a torque control device 17, etc. The vehicle 10 may also have a millimeter wave radar, as a distance sensor (not shown) for measurement of the distance of the vehicle 10 to surrounding objects. The vehicle control system 1 has at least the torque control device 17.

The camera 2, positioning information receiver 3, navigation device 4, UI 5, torque detector 6, map information storage device 11, location estimating device 12, object detector 13, traveling lane planning device 14, drive planning device 15, vehicle control device 16 and torque control device 17 are connected in a communicable manner through an in-vehicle network 18 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 18 to the location estimating device 12 and object detector 13. The camera image is also used for processing at the location estimating device 12 to estimate the location of the vehicle 10. At the object detector 13, the camera image is used for processing to detect other objects surrounding the vehicle 10.

The positioning information receiver 3 outputs positioning information that represents the current location of the vehicle 10. The positioning information receiver 3 may be a GNSS receiver, for example. The positioning information receiver 3 outputs positioning information and the positioning information acquisition time at which the positioning information has been acquired, to the navigation device 4 and map information storage device 11, etc., each time positioning information is acquired at a predetermined receiving cycle.

Based on the navigation map information, the destination location of the vehicle 10 input through the UI 5, and positioning information representing the current location of the vehicle 10 input from the positioning information receiver 3, the navigation device 4 creates a navigation route from the current location to the destination location of the vehicle 10. The navigation route includes information relating to the locations of right turns, left turns, merging and branching. When the destination location has been newly set or the current location of the vehicle 10 has exited the navigation route, the navigation device 4 creates a new navigation route for the vehicle 10. Every time a navigation route is created, the navigation device 4 outputs the navigation route to the location estimating device 12 and the traveling lane planning device 14, etc., via the in-vehicle network 18.

The UI 5 is an example of the notification unit. The UI 5, controlled by the navigation device 4, drive planning device 15, vehicle control device 16 and torque control device 17, etc., notifies the driver of the vehicle 10 traveling information. The traveling information of the vehicle 10 includes information relating to the current location of the vehicle and the current and future route of the vehicle, such as the navigation route. The UI 5 may also notify the driver of information indicating that the vehicle 10 has deviated from the lane marking line, and of requests for main operation of the vehicle 10 to be switched from the autonomous control system to the driver. The UI 5 has a display device 5a such as a liquid crystal display or touch panel, for display of the traveling information. The UI 5 may also have an acoustic output device (not shown) to notify the driver of traveling information. The UI 5 also generates an operation signal in response to operation of the vehicle 10 by the driver. The operation information may be, for example, a destination location, transit points, vehicle speed or other vehicle control information. The UI 5 also has a touch panel or operating button, for example, as an input device for inputting operation information from the driver to the vehicle 10. The UI 5 outputs the input operation information to the navigation device 4, the drive planning device 15 and the vehicle control device 16, via the in-vehicle network 18.

The torque detector 6 detects force causing the rotating shaft of the steering wheel to rotate, which has been produced by operation of the steering wheel by the driver, and outputs a signal indicating the force of rotation to the torque control device 17. The torque detector 6 may also detect the angle and angular velocity of the rotation axis of the steering wheel.

The map information storage device 11 stores wide-area map information for a relatively wide area (an area of 10 to 30 $km^2$, for example) that includes the current location of the vehicle 10. The map information preferably has high precision map information including three-dimensional information for the road surface, the speed limit for the road, the curvature of the road, and information for the types and locations of structures and road features such as road lane marking lines. The locations of lane marking lines in the map information are represented on a world coordinate system having a predetermined location as the origin.

The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 3, the map information storage device 11 refers to the stored wide-area map information and outputs map information for a relatively narrow area including the current location represented by the positioning information (for example, an area of 100 m² to 10 km²), through the in-vehicle network 18 to the location estimating device 12, object detector 13, traveling lane planning device 14, drive planning device 15 and vehicle control device 16, etc.

The location estimating device 12 estimates the location of the vehicle 10 at the camera image photograph time, based on the road features surrounding the vehicle 10 represented in the camera image taken by the camera 2a. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16, etc. Each time the estimated location, estimated declination and traveling lane of the vehicle 10 are determined at the camera image photograph time, the location estimating device 12 also outputs the location of the vehicle 10 and the location of the lane marking line represented in the map information, to the torque control device 17.

The object detector 13 detects other objects around the vehicle 10 and their types (for example, vehicles) based on the camera image. Other objects also include other vehicles traveling around the vehicle 10. The object detector 13 tracks other detected objects and determines the trajectories of the other objects. In addition, the object detector 13 identifies the traveling lanes in which the other objects are traveling, based on the lane marking lines represented in the map information and the locations of the objects. The object detector 13 also outputs object detection information which includes information representing the types of other objects that were detected, information indicating their locations, and also information indicating their traveling lanes, to the traveling lane planning device 14 and drive planning device 15, etc.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the drive planning device 15 of the traveling lane plan.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The surrounding environment information includes the locations and speeds of other vehicles traveling around the vehicle 10. The vehicle status information includes the current location of the vehicle 10, and the vehicle speed, acceleration and traveling direction. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other objects (such as vehicles).

The vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level, so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 18. The vehicle control device 16 also outputs a control signal corresponding to the set accelerator level, to a drive unit (engine or motor) of the engine of the vehicle 10, via the in-vehicle network 18. Alternatively, the vehicle control device 16 may output a control signal corresponding to a set brake level to the brake (not shown) of the vehicle 10, via the in-vehicle network 18.

The torque control device 17 carries out control processing, assessment processing, count processing and calculation processing. The drive planning device 15 comprises a communication interface (IF) 21, a memory 22 and a processor 23 for this purpose. The communication interface 21, memory 22 and processor 23 are connected via signal wires 24. The communication interface 21 has an interface circuit to connect the torque control device 17 with the in-vehicle network 18. The torque control device 17 is an example of the vehicle control device.

The memory 22 is an example of a memory unit, and it has a volatile semiconductor memory and a non-volatile semiconductor memory, for example. The memory 22 stores an application computer program and various data to be used for information processing carried out by the processor 23.

All or some of the functions of the torque control device 17 are functional modules driven by a computer program operating on the processor 23, for example. The processor 23 has a control unit 231, a determining unit 232, a counting unit 233 and a calculating unit 234. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit.

The control unit 231 detects driver torque based on the signal representing the force causing the steering wheel to rotate, which was input from the torque detector 6. As shown in FIG. 1B, when the control unit 231 detects driver torque at or above the target torque, it controls a driving unit (not shown) which rotates the rotating shaft of the steering wheel, to apply anti-torque to the steering wheel to correspond to the size of the driver torque. The driving unit is controlled by the control unit 231 to apply anti-torque to the rotating shaft of the steering wheel. The control unit 231 may also set the anti-torque based on the angle or angular velocity of the rotating shaft of the steering wheel, together with driver torque. The direction of the anti-torque is the direction opposite to driver torque. Another operation for the torque control device 17, including processing for setting the target torque, will be described below.

The map information storage device 11, location estimating device 12, object detector 13, traveling lane planning device 14, drive planning device 15, vehicle control device 16 and torque control device 17 are electronic control units (ECU), for example. For FIG. 2, the map information storage device 11, location estimating device 12, object detector 13, traveling lane planning device 14, drive planning device 15, vehicle control device 16 and torque control device 17 were explained as separate devices, but all or some of them may be constructed in a single device.

Figure 3:
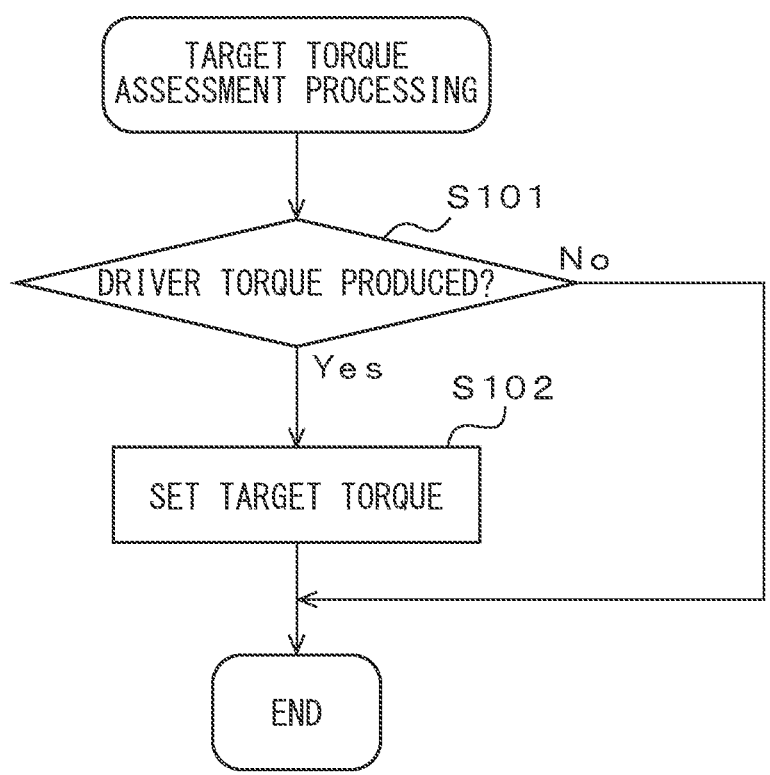
FIG. 3 is an example of an operation flow chart for target torque assessment processing by the torque control device of the embodiment.

FIG. 3 is an example of an operation flow chart for target torque assessment processing by the torque control device 17 of the embodiment. Target torque assessment processing by the torque control device 17 will be described with reference to FIG. 3. The torque control device 17 carries out target torque assessment processing according to the operation flow chart shown in FIG. 3, at a target torque assessment time having a predetermined cycle. The predetermined cycle may be 0.05 to 0.1 millisecond, for example.

First, the determining unit 232 determines whether or not driver torque has been produced (step S101). The determining unit 232 detects driver torque based on the signal representing the force causing the steering wheel to rotate, which was input from the torque detector 6. When driver torque at or above a predetermined threshold torque has been produced during at least a predetermined reference time, the determining unit 232 determines that driver torque has been produced. The threshold torque is preferably set, for example, to a level that is not affected by noise that may be included in the signal input from the torque detector 6.

When driver torque has been produced (step S101—Yes), the determining unit 232 sets the target torque based on the reference torque and the current correction value for the reference torque (step S102), and the series of processing steps is complete. The size of the reference torque is a reference for driver torque at which generation of anti-torque on the steering wheel is to be initiated in response to driver torque produced on the steering wheel by operation of the steering wheel by the driver. The size of the reference torque is preferably set so that intentional operation of the steering wheel by the driver can be detected.

The size of the target torque is the target for driver torque at which generation of anti-torque on the steering wheel is to be initiated. The correction value includes a first correction value M1 determined based on the number of deviations from the lane marking lines of the lane in which the vehicle is traveling. The control unit 231 determines whether or not the size of the driver torque has reached the target torque. The determining unit 232 is an example of a target torque setting unit.

The determining unit 232 calculates the target torque Tb as the value obtained by subtracting the current first correction value M1 set based on the number of deviations, from the reference torque Ta, as shown in the following formula (1).

$$Tb = Ta - M1 \quad (1)$$

The determining unit 232 may also calculate the correction value for the reference torque to be the value of a current second correction value M2 set based on the distance that the vehicle 10 has traveled without counting the number of deviations, subtracted from the current first correction value M1. In this case, the determining unit 232 calculates the target torque Tb to be the value of the current second correction value M2 added to the difference between the reference torque Ta and the current first correction value M1, as shown in the following formula (2). Processing for calculation of the first correction value M1 and second correction value M2 is described below.

$$Tb = Ta - M1 + M2 \quad (2)$$

When driver torque has not been produced (step S101—No), the series of processing steps is complete.

When it has been determined that driver torque has been produced and the target torque has been set, the determining unit 232 preferably does not begin new target torque assessment processing until it has been determined that the driver torque has disappeared. When driver torque at or above a predetermined threshold torque has not been produced during at least a predetermined reference time, the determining unit 232 determines that driver torque has disappeared.

Figure 4:
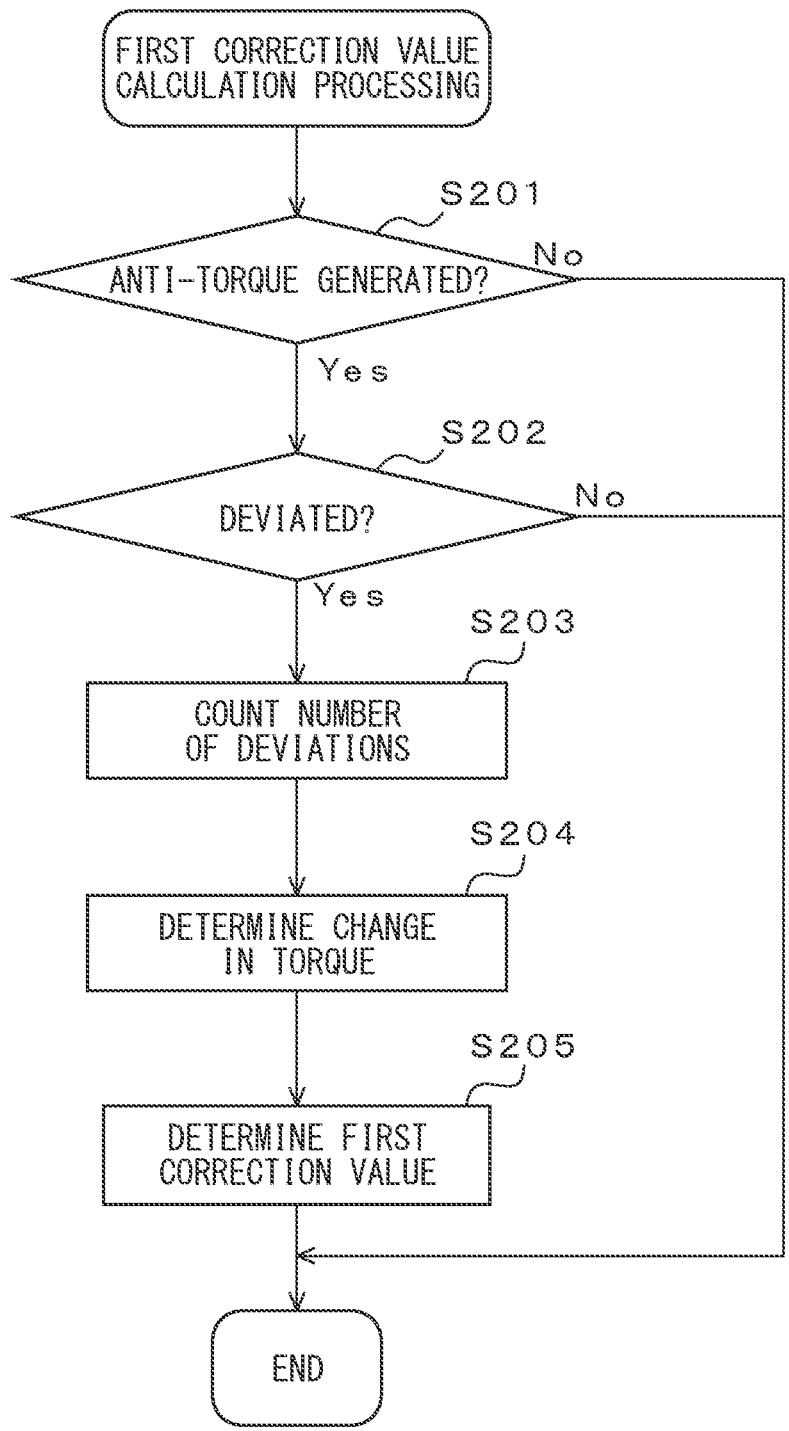
FIG. 4 is an example of an operation flow chart for first correction value calculation processing by the torque control device of the embodiment.

First correction value calculation processing will now be explained with reference to FIG. 4. FIG. 4 is an example of an operation flow chart for first correction value calculation processing by the torque control device 17 of the embodiment. The torque control device 17 carries out first correction value calculation processing according to the operation flow chart shown in FIG. 4, each time driver torque disappears after it has been determined that driver torque was produced. When driver torque at or above a predetermined threshold torque has not been produced during at least a predetermined reference time, the torque control device 17 determines that driver torque has disappeared.

First, the counting unit 233 determines whether or not anti-torque has been generated against the current manipulation of the steering wheel by the driver (step S201). Even when driver torque has been produced, anti-torque is not generated if the size of the driver torque is less than the target torque.

When anti-torque has been generated (step S201—Yes), the counting unit 233 determines whether or not the vehicle 10 has deviated from the lane marking line of the lane in which it is traveling, while driver torque exceeds the target torque (step S202). The counting unit 233 calculates the location of the right edge and the location of the left edge of the vehicle 10 based on the location of the vehicle 10. The right edge location and left edge location of the vehicle 10 are represented on the world coordinate system, for example. The counting unit 233 also compares the right edge location and left edge location of the vehicle 10 with the location of the lane marking lines on both sides of the current location of the vehicle 10. The counting unit 233 also determines whether or not the vehicle 10 has deviated from the lane marking line of the lane in which it is traveling when the right edge of the vehicle 10 has crossed over the location of the lane marking line or the left edge of the vehicle 10 has crossed over the location of the lane marking line, while driver torque exceeds the target torque. Anti-torque is thus generated while driver torque exceeds the target torque.

When the vehicle 10 has deviated from the lane marking line of the lane in which it is traveling (step S202—Yes), the counting unit 233 counts the number of times the vehicle 10 has deviated from the lane marking line of the lane in which it is traveling (step S203). The initial value for the number of deviations is zero.

The calculating unit 234 then calculates the amount of change in driver torque with respect to the target torque, each time the number of deviations is counted (step S204). The calculating unit 234 is an example of the change calculating unit. Using the following formula (3), the calculating unit 234 calculates the amount of change in driver torque S with respect to the target torque, during the period after it has been assessed that driver torque was produced, until it is determined that driver torque has disappeared. The start time t1 is the time until the driver torque reaches the target torque, while the end time t2 is the time at which the driver torque falls below the target torque. The variable Td is the absolute value of the anti-torque (see FIG. 1B).

$$S = \int_{t1}^{t2} T_d dt \qquad (3)$$

Next, the calculating unit 234 calculates a new first correction value for the reference torque, based on the correction coefficient that is set based on the number of deviations and the amount of change in driver torque with respect to the target torque (step S205), and the series of processing steps is complete. The calculating unit 234 is an example of the correction value calculating unit.

When anti-torque has not been generated (step S201—No), or when the vehicle 10 has not deviated from the lane marking line of the lane in which it is traveling (step S202—No), the series of processing steps is complete.

Processing in which the calculating unit 234 calculates a new first correction value will now be explained with reference to FIG. 5. The calculating unit 234 calculates a new first correction value as the product S of the correction coefficient that is set based on the number of deviations, and the amount of change in driver torque with respect to the reference torque.

Figure 5:
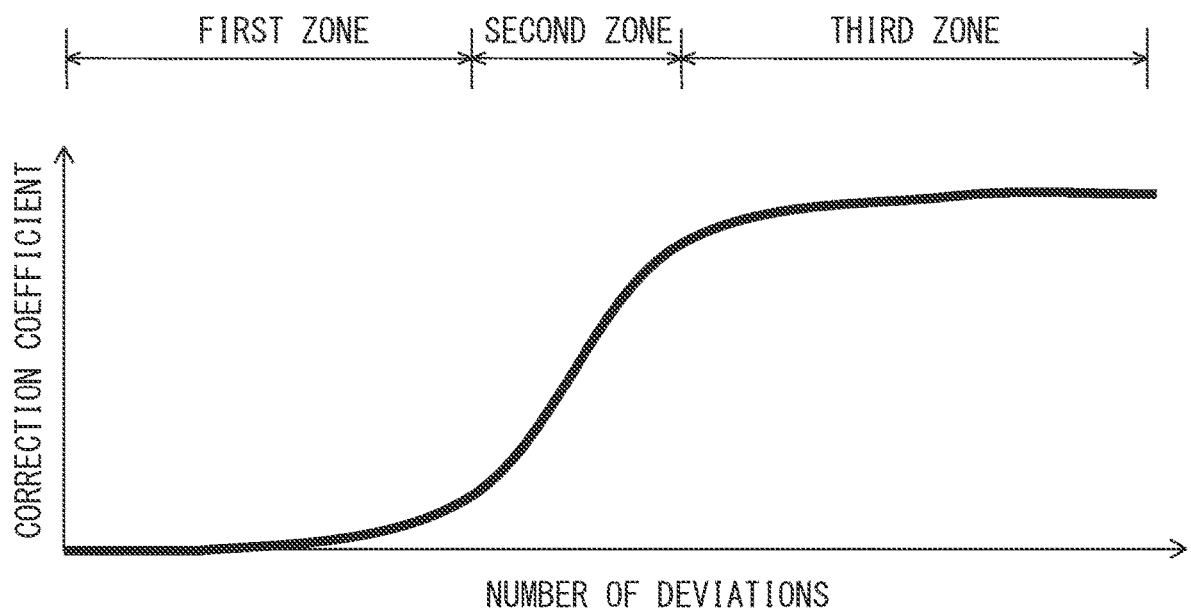
FIG. 5 is a diagram showing an example of the relationship between correction coefficient and number of deviations.

FIG. 5 is a diagram showing an example of the relationship between the correction coefficient and the number of deviations. The relationship between the correction coefficient and the number of deviations has a first zone in which the correction coefficient increases as the number of deviations increases, a second zone in which the correction coefficient increases more than the first zone as the number of deviations increases, and a third zone in which the correction coefficient increases less than the second zone as the number of deviations increases. In some cases during the course of learning the first correction value, manipulation of the steering wheel by the driver at the early stage of learning may be coincidental, and therefore the correction coefficient is small (first zone). When there is a tendency for the driver to manipulate the steering wheel, the correction coefficient is large (second zone). However, the correction coefficient has an upper limit in practice (third zone). The correction coefficient used may be a sigmoid function, for example. For this embodiment, the correction coefficient is positive.

The product M1 of the correction coefficient and the amount of change in driver torque S (the first correction value) is calculated by the following formula (4). Here, "i" is the number of deviations, $\alpha_i$ is the correction coefficient for the "ith" deviation, and $S_i$ is the amount of change in driver torque for the "ith" deviation. The initial value $\alpha_0$ of the correction coefficient may also be zero.

$$M1 = \alpha_i S_i \qquad (4)$$

The correction coefficient is zero or a positive value. The amount of change in driver torque is also zero or a positive value. Therefore, the first correction value M1 is similarly zero or a positive value. An upper limit is preferably set for the first correction value M1. The upper limit may be determined experimentally or empirically, for example.

Figure 6:
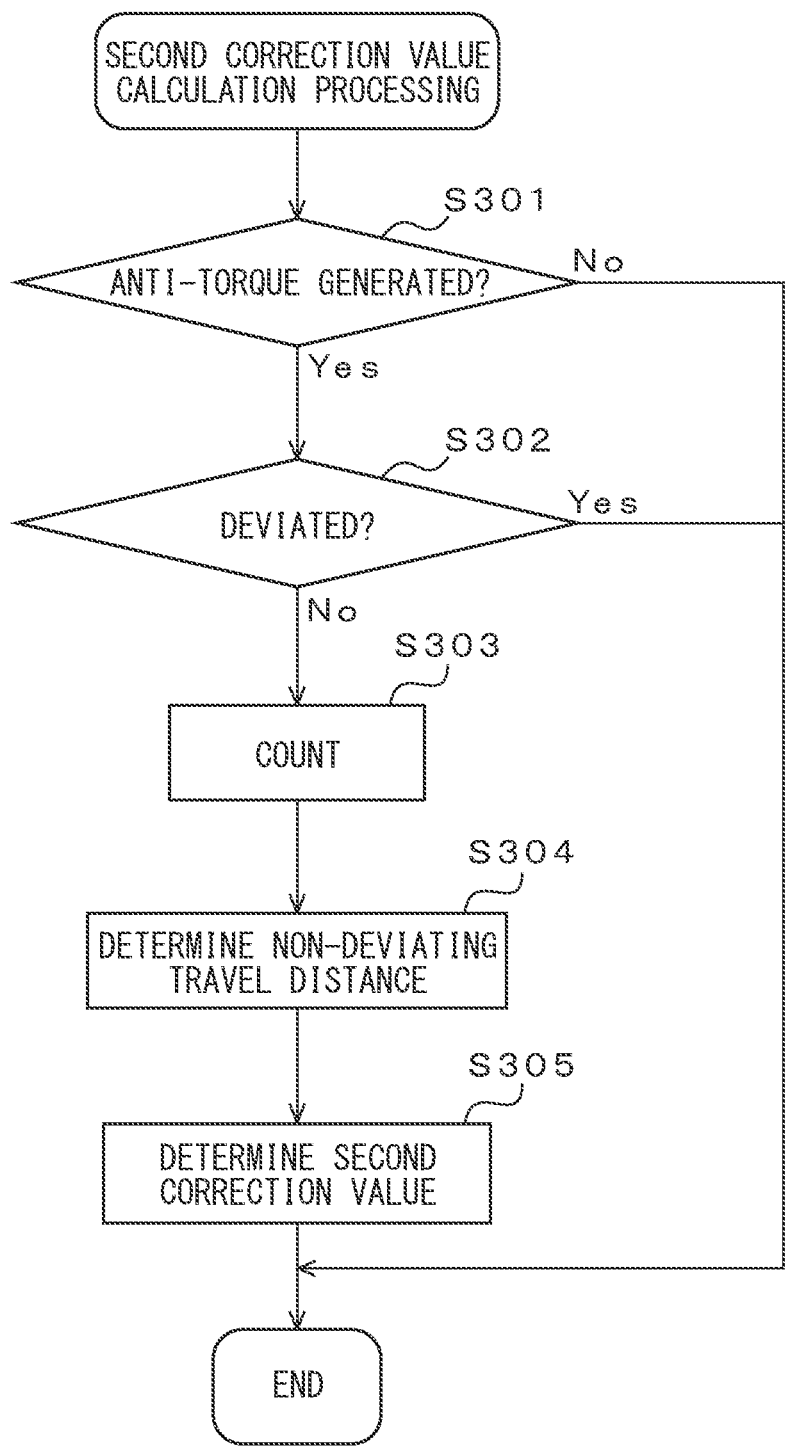
FIG. 6 is an example of an operation flow chart for second correction value calculation processing by the torque control device of the embodiment.

Second correction value calculation processing will now be explained with reference to FIG. 6. FIG. 6 is an example of an operation flow chart for second correction value calculation processing by the torque control device 17 of the embodiment. The torque control device 17 calculates a second correction value based on the distance that the vehicle 10 has traveled when the driver torque exceeds the target torque and the number of deviations is not counted. Specifically, the torque control device 17 carries out second correction value calculation processing according to the operation flow chart shown in FIG. 6, each time it is determined that driver torque has disappeared after it has been determined that driver torque was produced.

The processing in steps S301 and S302 is the same as the processing in steps S201 and S202.

When the vehicle 10 has not deviated from the lane marking line of the lane in which it is traveling (step S302—No), the counting unit 233 counts the number of non-deviations as the number of times the vehicle 10 has not deviated from the lane marking line of the lane in which it is traveling (step S303). The initial value for the number of non-deviations is zero.

The calculating unit 234 then calculates the non-deviating travel distance, as the distance the vehicle 10 has traveled with the driver torque exceeding the target torque and with the number of deviations not counted (step S304). The calculating unit 234 calculates the non-deviating travel distance that the vehicle 10 has traveled between the start time at which the driver torque has reached the target torque, and the end time at which the driver torque has fallen below the target torque.

The calculating unit 234 calculates a new second correction value for the reference torque, based on the correction coefficient that is set based on the number of non-deviations, and the non-deviating travel distance (step S305), and the series of processing steps is complete. The aforementioned explanation for processing to calculate the first correction value may be applied for processing to calculate the second correction value as well.

When anti-torque has not been generated (step S301—No), or when the vehicle 10 has deviated from the lane marking line of the lane in which it is traveling (step S302—Yes), the series of processing steps is complete.

Processing in which the calculating unit 234 calculates a new second correction value will now be explained. The calculating unit 234 calculates a new second correction value as the product of the correction coefficient that is set based on the number of non-deviations, and the non-deviating travel distance. The initial value of the correction coefficient may also be zero.

The relationship between the correction coefficient and the number of non-deviations is the same as the relationship between the correction coefficient and the number of deviations shown in FIG. 5. The relationship between the correction coefficient and the number of non-deviations has a first zone in which the correction coefficient increases as the number of non-deviations increases, a second zone in which the correction coefficient increases more than the first zone as the number of non-deviations increases, and a third zone in which the correction coefficient increases less than the second zone as the number of non-deviations increases. In some cases during the course of learning the second correction value, manipulation of the steering wheel by the driver at the early stage may be coincidental, and therefore the correction coefficient is small (first zone). When there is a tendency for the driver to manipulate the steering wheel, the correction coefficient is high (second zone). However, the correction coefficient has an upper limit in practice (third zone). The correction coefficient used may be a sigmoid function, for example. For this embodiment, the correction coefficient is positive.

The correction coefficient for calculation of the second correction value is zero or a positive value. The non-deviating travel distance is a positive value. Therefore, the second correction value M2 is also zero or a positive value. An upper limit is preferably set for the second correction value M2. The upper limit may be determined experimentally or empirically, for example.

Figure 7:
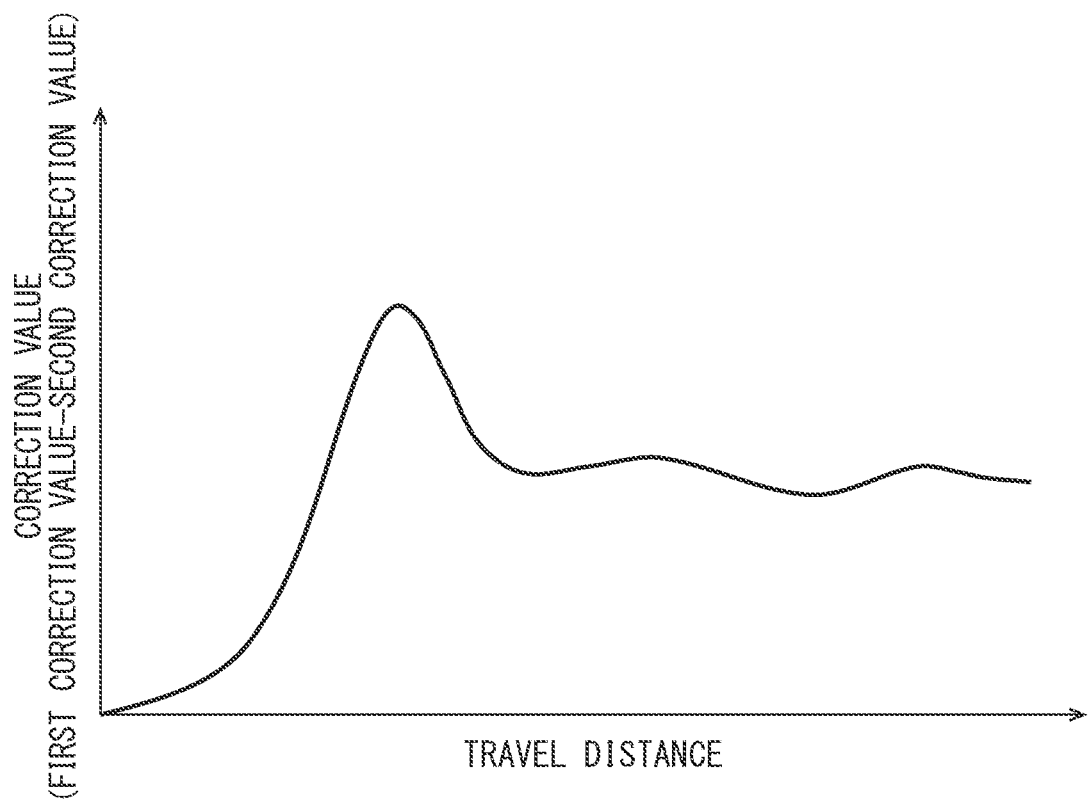
FIG. 7 is a diagram showing an example of the relationship between correction value and travel distance.

FIG. 7 is a diagram showing an example of the relationship between correction value and travel distance. The correction value is represented as a value obtained by subtracting the second correction value from the first correction value. If the anti-torque is large when the steering wheel has been manipulated, the driver will apply driver torque to the steering wheel with addition of rotary force to counteract the anti-torque in order to manipulate the steering wheel.

As a result, even if the driver has unconsciously manipulated the steering wheel, for example, the driver will still be aware of their own steering. In addition, having felt the anti-torque, the driver will reduce the level of manipulation of the steering wheel. It is therefore possible that the second correction value will increase with greater traveling distance.

When the vehicle 10 deviates from the lane marking line, the control unit 231 notifies the driver via the UI 5 that the vehicle 10 has deviated from the lane marking line. During this time, the control unit 231 may also make a request for switching of operation of the vehicle 10 from autonomous control to driver control.

Notification that anti-torque has increased or that deviation has occurred from a lane marking line may result in decreased operation of the steering wheel by the driver that was causing the vehicle 10 to deviate from the lane marking line, so that the correction value will tend to converge on a value reflecting driver preference.

Since the torque control device of this embodiment sets the starting point at which anti-torque is applied to the steering wheel based on past operation of the steering wheel by the driver, as explained above, this helps to prevent deviation of the vehicle from the lane marking lines of the lane in which it is traveling, in a manner matching the steering characteristics of different individual drivers. For example, if the threshold for generating anti-torque based on past operation of the steering wheel by the driver is set to be low, then anti-torque will be generated even with light steering by the driver, thus allowing the driver to be more aware of steering. The torque control device of the embodiment can thereby help avoid unconscious steering operation by the driver to prevent deviation from lane marking lines.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

For example, when the location where the vehicle is located is in bad weather with rain or snow, the correction coefficient may be zero or smaller, compared to when it is in a favorable weather location with sunny weather, for example. Since the road surface is wetted in bad weather, the vehicle driving conditions will differ from a weather situation with a dry road surface. This can lower the effect that correction in bad weather may have over the correction value in good weather. The correction value may also be determined separately for good weather and for bad weather.

The invention claimed is:

1. A vehicle control device comprising:
a processor configured to
set a target torque as a target for driver torque at which generation of anti-torque on a steering wheel is to be initiated, based on a reference torque as a reference for driver torque at which generation of anti-torque is to be initiated against the driver torque produced by operation of the steering wheel by a driver, and a current correction value for the reference torque,
count a number of deviations from lane marking line dividing a lane in which the vehicle is traveling and an adjacent lane while the driver torque exceeds the target torque, and
calculate a new correction value for the reference torque based on the number of deviations,
wherein a next target torque is set based on the reference torque and the new correction value for the reference torque.

2. The vehicle control device according to claim 1, wherein the processor is further configured to
calculate an amount of change in driver torque with respect to the target torque, and
calculate the new correction value for the reference torque based on the correction coefficient and the amount of change in driver torque.

3. The vehicle control device according to claim 1, wherein the processor is further configured to
calculate a second correction value based on distance that the vehicle has traveled while the driver torque exceeds the target torque and the number of deviations is not counted, and
set the next target torque based on the reference torque, the new correction value for the reference torque and the second correction value.

4. The vehicle control device according to claim 1, wherein relationship between a correction coefficient configured to change the current correction value and the number of deviations has a first zone in which a change in the correction coefficient per a change in the number of deviations increases as the number of deviations increases, a second zone in which a change in the correction coefficient per a change in the number of deviations is greater than the first zone as the number of deviations increases, and a third zone in which a change in the correction coefficient per a change in the number of deviations increases as the number of deviations increases and the change is less than the second zone.

5. A computer-readable, non-transitory storage medium storing a computer program for vehicle control, which causes a processor execute a process and the process comprising:
setting a target torque as a target for driver torque at which generation of anti-torque on a steering wheel is to be initiated, based on a reference torque as a reference for driver torque at which generation of anti-torque is to be initiated against the driver torque produced by operation of the steering wheel by a driver, and a current correction value for the reference torque;

counting a number of deviations from a lane marking line dividing a lane in which the vehicle is traveling and an adjacent lane while the driver torque exceeds the target torque; and calculating a new correction value for the reference torque based on the number of deviations, wherein a next target torque is set based on the reference torque and the new correction value for the reference torque.

6. A method for controlling a vehicle which is carried out by a vehicle control device and the method comprising:

setting a target torque as a target for driver torque at which generation of anti-torque on a steering wheel is to be initiated, based on a reference torque as a reference for driver torque at which generation of anti-torque is to be initiated against the driver torque produced by operation of the steering wheel by a driver, and a current correction value for the reference torque;

counting a number of deviations from a lane marking line dividing a lane in which the vehicle is traveling and an adjacent lane while the driver torque exceeds the target torque; and calculating a new correction value for the reference torque based on the number of deviations, wherein a next target torque is set based on the reference torque and the new correction value for the reference torque.

\* \* \* \* \*